(12) United States Patent
Kim et al.

(10) Patent No.: US 7,812,810 B2
(45) Date of Patent: Oct. 12, 2010

(54) INVERTER DRIVING APPARATUS AND LIQUID CRYSTAL DISPLAY INCLUDING INVERTER DRIVING APPARATUS

(75) Inventors: Sang-Soo Kim, Seoul (KR); Moon-Shik Kang, Seongnam (KR); Jin-Ho Ha, Suwon (KR); Seung-Hwan Moon, Yongin (KR)

(73) Assignee: Samsung Electronics Co., Ltd. (KR)

( * ) Notice: Subject to any disclaimer, the term of this patent is extended or adjusted under 35 U.S.C. 154(b) by 676 days.

(21) Appl. No.: 11/833,631

(22) Filed: Aug. 3, 2007

(65) Prior Publication Data

US 2008/0024422 A1 Jan. 31, 2008

Related U.S. Application Data

(62) Division of application No. 10/656,459, filed on Sep. 5, 2003, now Pat. No. 7,268,766.

(30) Foreign Application Priority Data

Sep. 5, 2002 (KR) .................... 2002-0053540

(51) Int. Cl.
*G09G 3/36* (2006.01)
(52) U.S. Cl. ..................... 345/102; 345/73
(58) Field of Classification Search .......... 345/48, 345/73, 74.1, 76, 87, 102, 204, 211; 315/210, 315/250, 324, 325; 362/97.1–97.3
See application file for complete search history.

(56) References Cited

U.S. PATENT DOCUMENTS

| | | | |
|---|---|---|---|
| 5,844,540 A | 12/1998 | Terasaki | |
| 6,417,833 B1 | 7/2002 | Takemoto | |
| 6,803,901 B1 | 10/2004 | Numao | |
| 6,917,354 B2 | 7/2005 | Fujishiro et al. | |
| 6,956,555 B2 | 10/2005 | Kyomoto | |
| 6,982,686 B2 | 1/2006 | Miyachi et al. | |
| 7,019,728 B2 | 3/2006 | Lee et al. | |
| 2002/0008694 A1 | 1/2002 | Miyachi et al. | |
| 2002/0057247 A1 | 5/2002 | Lee et al. | |

FOREIGN PATENT DOCUMENTS

| | | |
|---|---|---|
| JP | 3296090 | 12/1991 |
| JP | 7325286 | 12/1995 |
| JP | 2000293142 | 10/2000 |
| JP | 2001110582 | 4/2001 |
| JP | 2001183622 | 7/2001 |
| JP | 2002107708 | 4/2002 |
| KR | 19990080868 | 11/1999 |
| KR | 1020010007304 | 1/2001 |
| KR | 1020020067014 | 8/2002 |

*Primary Examiner*—Regina Liang
(74) *Attorney, Agent, or Firm*—Cantor Colburn LLP

(57) ABSTRACT

An inverter driving apparatus for driving a plurality of lamp units is provided. The inverter driving apparatus includes a plurality of inverter boards for generating driving signals for driving respective lamp units based on a control signal and a voltage signal. Each lamp unit includes at least one lamp, and the plurality of inverter boards are connected in series and include a first outer inverter board receiving the control signal and a second outer inverter board located opposite the first outer inverter board receiving the voltage signal. Each of the plurality of inverter boards transmits the control signal and/or the voltage signal to at least one of the plurality of inverter boards adjacent thereto.

14 Claims, 6 Drawing Sheets

INVERTER DRIVING APPARATUS AND LIQUID CRYSTAL DISPLAY INCLUDING INVERTER DRIVING APPARATUS

CROSS REFERENCE TO RELATED APPLICATIONS

This application is a divisional application of U.S. application Ser. No. 10/656,459 filed Sep. 5, 2003, which claims priority to and the benefit of Korean Patent Application No. 2002-0053540, filed on Sep. 5, 2002, all of which are incorporated by reference herein in their entirety.

BACKGROUND OF THE INVENTION (a) Field of the Invention

The present invention relates to an inverter driving apparatus and a liquid crystal display including an inverter driving apparatus.

(b) Description of the Related Art

Display devices used for monitors of computers and television sets include self-emitting displays such as light emitting diodes (LEDs), electroluminescences (ELs), vacuum fluorescent displays (VFDs), field emission displays (FEDs) and plasma panel displays (PDPs) and non-emitting displays such liquid crystal displays (LCDs) requiring light source.

An LCD includes two panels provided with field-generating electrodes and a liquid crystal (LC) layer with dielectric anisotropy interposed therebetween. The field-generating electrodes supplied with electric voltages generate electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source such as a lamp equipped in the LCD or may be natural light. When using the equipped light source, the total brightness of the LCD screen is usually adjusted using an inverter by regulating the ratio of on and off times of the light source or by regulating the current through the light source.

The LCD for a large screen system such as television sets, which is required to have high luminance, includes several inverter boards, each inverter board driving at least one lamp. Accordingly, several wires for signal transmission of voltage signals from a system board of the system to each inverter board and for signal transmission of control signals from a control board, which controls display operations of the panels based on signals from the system board, to each inverter board are required and make the configuration of the LCD complicated. Sometimes, the complicated wire configuration needs a separate circuit board for the wires supplying the voltage signals and the control signals, which increases the production cost of the system. Furthermore, the length of the wires is increased to increase the power loss between the inverter board and the system board or the control board.

SUMMARY OF THE INVENTION

A motivation of the present invention is to solve the problems of the conventional art.

According to an embodiment of the present invention, an inverter driving apparatus for driving a plurality of lamp units is provided, which includes: a plurality of inverter boards for generating driving signals for driving respective lamp units based on a control signal and a voltage signal. Each lamp unit includes at least one lamp, and the plurality of inverter boards are connected in series and include a first outer inverter board receiving the control signal and a second outer inverter board located opposite the first outer inverter board receiving the voltage signal. Each of the plurality of inverter boards transmits the control signal and/or the voltage signal to at least one of the plurality of inverter boards adjacent thereto.

The at least one lamp of each lamp unit preferably includes a plurality of lamps connected in parallel.

The serial connection between the inverter boards is preferably made along a direction perpendicular to a length direction of the at least one lamp.

Each of the plurality of inverter boards preferably includes two connectors for signal transmission of the control signal and the voltage signal.

It is preferable that each connector preferably has a plurality of pins, and the pins of adjacent two of the connectors are arranged in opposite order. For example, the pins of the two connectors in each of the plurality of inverter boards are arranged in opposite order and furthermore, the pins of adjacent two connectors in adjacent two of the plurality of inverter boards are arranged in opposite order.

The two connectors of each of the plurality of inverter boards preferably includes a first connector for receiving the control signal and transmitting the voltage signal and a second connector for receiving the voltage signal and transmitting the control signal.

Each of the plurality of inverter boards may further include a plurality of electrical members electrically connected to the connectors for generating the driving signal and/or a plurality of wires for interconnecting the two connectors included therein.

Preferably, the first outer inverter board includes a first connector for receiving the control signal and a second connector for receiving the voltage signal from and transmitting the control signal to another of the plurality of inverter boards and the second outer inverter board includes a first connector for receiving the voltage signal and a second connector for receiving the control signal from and transmitting the voltage signal to another of the plurality of inverter boards. The plurality of inverter boards may further include an intermediate inverter board connected to the first outer inverter board and including a first connector for receiving the control signal from and transmitting the voltage signal to the first outer inverter board and a second connector for receiving the voltage signal from and transmitting the control signal to another of the plurality of inverter boards. Similarly, the plurality of inverter boards may further include an intermediate inverter board connected to the second outer inverter board and including a first connector for receiving the control signal from and transmitting the voltage signal to another of the plurality of inverter boards and a second connector for receiving the voltage signal from and transmitting the control signal to the second outer inverter board.

A liquid crystal display is provided, which includes: a liquid crystal panel assembly including a plurality of gate lines, a plurality of data lines, and a plurality of pixels connected to the gate lines and the data lines; a gate driving circuit for driving the gate lines; a data driving circuit for driving the data lines; a plurality of lamp units including a plurality of lamps illuminating the panel assembly; a system board for generating image signals, first control signals for controlling the image signals, and a voltage signal for driving the lamps; a control board for processing the image signals from the system board based on the first control signals from the system board, generating second control signals for controlling the processed image signals and a third control signal for driving the lamps, and providing the processed image signals and the second control signals for the driving circuits; and a plurality of inverter boards connected in series for generating driving signals for driving the lamps based on the third control signal from the control board and the voltage signal from the system board.

Preferably, each inverter board transmits the third control signal or the voltage control signal to at least one of inverter boards adjacent thereto and a transmission path of the third control signal is opposite a transmission path of the voltage signal.

The at least one lamp of each lamp unit preferably includes a plurality of lamps connected in parallel.

The serial connection between the inverter boards is preferably made along a direction perpendicular to a length direction of the at least one lamp.

Each of the plurality of inverter boards preferably includes two connectors for signal transmission of the control signal and the voltage signal.

It is preferable that each connector preferably has a plurality of pins, and the pins of adjacent two of the connectors are arranged in opposite order. For example, the pins of the two connectors in each of the plurality of inverter boards are arranged in opposite order and furthermore, the pins of adjacent two connectors in adjacent two of the plurality of inverter boards are arranged in opposite order.

The two connectors of each of the plurality of inverter boards preferably includes a first connector for receiving the control signal and transmitting the voltage signal and a second connector for receiving the voltage signal and transmitting the control signal.

Each of the plurality of inverter boards may further include a plurality of electrical members electrically connected to the connectors for generating the driving signal and/or a plurality of wires for interconnecting the two connectors included therein.

Each lamp unit preferably has first and second terminals connected to corresponding one of the inverter boards. The first terminal is grounded, and the second terminal is supplied with a predetermined voltage. Each inverter board is preferably closer to the second terminal of the corresponding lamp unit than to the first terminal thereof.

Alternatively, each lamp unit has first and second terminals supplied with positive and negative voltages, respectively. Each inverter board is preferably located near the center of the corresponding lamp unit.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
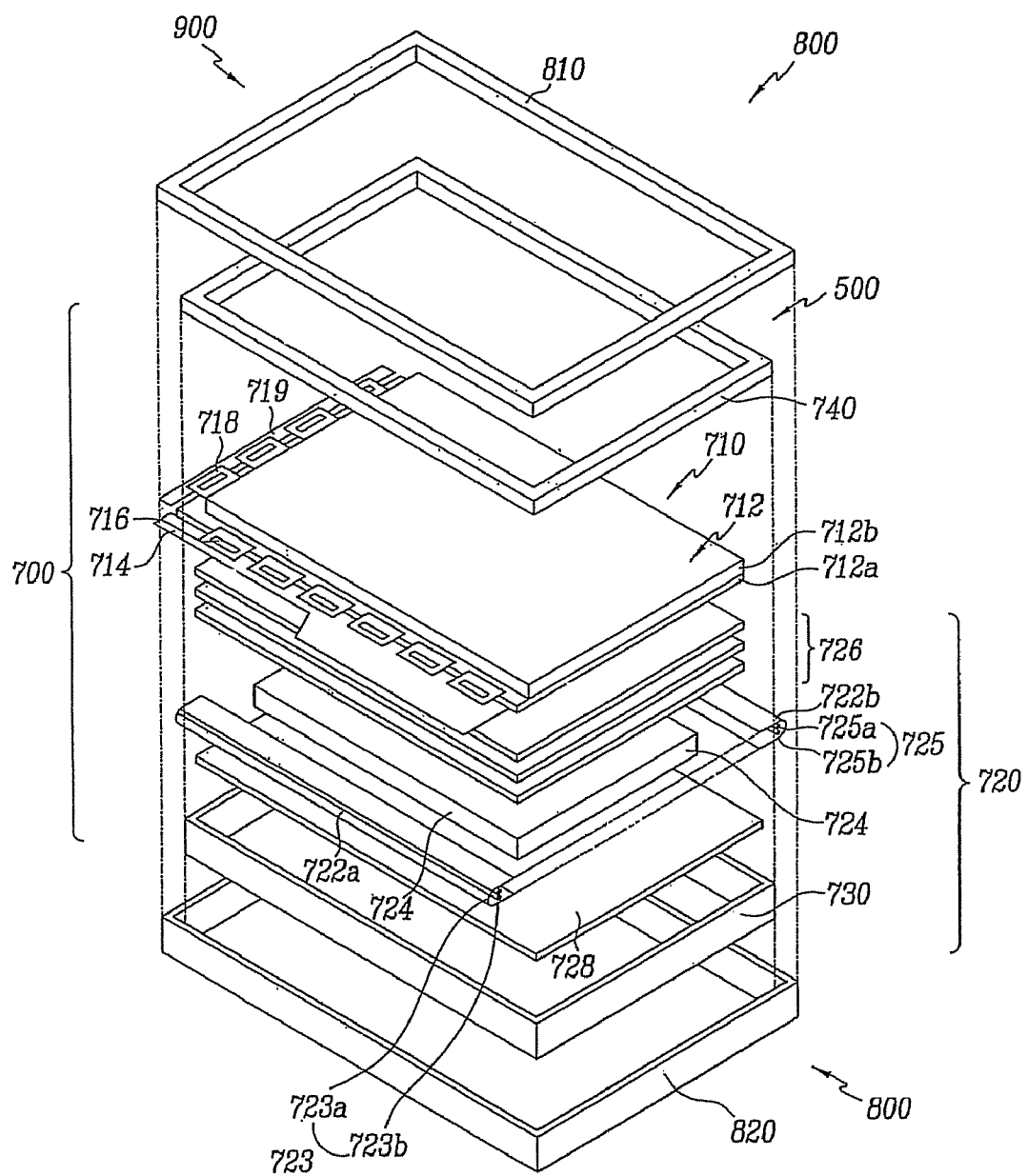
FIG. 1 is an exploded perspective view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

FIG. 1 is an exploded perspective view of an LCD according to an embodiment of the present invention.

In structural view, an LCD 900 according to an embodiment of the present invention includes a LC module 700 including a display unit 710 and a backlight unit 720, and a pair of front and rear cases 810 and 820, a chassis 740, and a mold frame 730 containing and fixing the LC module 700 as shown in FIG. 1.

The display unit 710 includes the LC panel assembly 712, a plurality of gate tape carrier packages (TCPs) 718 and a plurality of data TCPs 716 attached to the LC panel assembly 712, and a gate printed circuit board (PCB) 719 and a data PCB 714 attached to the associated TCPs 718 and 716, respectively.

The LC panel assembly 712, in structural view shown in FIG. 1, includes a lower panel 712a, an upper panel 712b and a liquid crystal layer (not shown) interposed therebetween while it includes a plurality of display signal lines (not shown) and a plurality of pixels (not shown) connected thereto and arranged substantially in a matrix in circuital view.

The display signal lines are provided on the lower panel 712a and include a plurality of gate lines (not shown) transmitting gate signals (called scanning signals) and a plurality of data lines (not shown) transmitting data signals. The gate lines extend substantially in a row direction and are substantially parallel to each other, while the data lines extend substantially in a column direction and are substantially parallel to each other.

Each pixel includes a switching element connected to the display signal lines, and an LC capacitor and a storage capacitor that are connected to the switching element. The storage capacitor may be omitted if unnecessary.

The switching element such as a TFT is provided on the lower panel 712a and has three terminals: a control terminal connected to one of the gate lines; an input terminal connected to one of the data lines; and an output terminal connected to the LC capacitor and the storage capacitor.

The LC capacitor includes a pixel electrode (not shown) on the lower panel 712a, a common electrode (not shown) on the upper panel 712b, and the LC layer as a dielectric between the electrodes. The pixel electrode is connected to the switching element and preferably made of transparent conductive material such as indium tin oxide (ITO) and indium zinc oxide (IZO) or reflective conductive material. The common electrode covers the entire surface of the upper panel 712a and is preferably made of transparent conductive material such as ITO and IZO and supplied with a common voltage. Alternatively, both the pixel electrode and the common electrode, which have shapes of bars or stripes, are provided on the lower panel 712a.

The storage capacitor is an auxiliary capacitor for the LC capacitor. The storage capacitor includes the pixel electrode and a separate signal line (not shown), which is provided on the lower panel 712a, overlaps the pixel electrode via an insulator, and is supplied with a predetermined voltage such as the common voltage. Alternatively, the storage capacitor includes the pixel electrode and an adjacent gate line called a previous gate line, which overlaps the pixel electrode via an insulator.

For color display, each pixel represent its own color by providing one of a plurality of red, green and blue color filters in an area occupied by the pixel electrode. The color filter is provided in the corresponding area of the upper panel 712b. Alternatively, the color filter is provided on or under the pixel electrode on the lower panel 712a.

Referring to FIG. 1, the backlight unit 720 includes a plurality of lamps 723 and 725 disposed near edges of the LC panel assembly 712, a pair of lamp covers 722a and 722b for protecting the lamps 723 and 725, a light guide 724 and a plurality of optical sheets 726 disposed between the panel assembly 712 and the lamps 723 and 725 and guiding and diffusing light from the lamps 723 and 725 to the panel assembly 712, and a reflector 728 disposed under the lamps 723 and 725 and reflecting the light from the lamps 723 and 725 toward the panel assembly 712.

The light guide 724 is an edge type and has uniform thickness, and the number of the lamps 723 and 725 is determined in consideration of the operation of the LCD. The lamps 723 and 725 preferably include fluorescent lamps such as CCFL (cold cathode fluorescent lamp) and EEFL (external electrode fluorescent lamp). An LED is another example of the lamp 723 and 725.

A pair of polarizers (not shown) polarizing the light from the lamps 723 and 725 are attached on the outer surfaces of the panels 712a and 712b of the panel assembly 712.

The TCPs 716 and 718 are a kind of flexible printed circuit (FPC) films and attached to edges of the LC panel assembly 712. A plurality of data driving integrated circuit (IC) chips connected to the data lines of the LC panel assembly 712 and applying data voltages thereto are mounted on the data TCP 716. Similarly, plurality of gate driving IC chips connected to the gate lines of the LC panel assembly 712 and applying gate voltages thereto after combining a gate-on voltage and a gate-off voltage are mounted on the data TCP 718.

The PCBs 714 and 719 are connected to the TCPs 716 and 718 and include circuit elements for receiving image signals and input control signals for controlling the image signals, processing the image signals, and generating output control signals for the processed image signals to be provided for the driving ICs on the TCPs 716 and 718.

According to other embodiments of the present invention, the gate driving circuits and/or the data driving circuits are chip-mounted on the lower panel 712a, while one or both of the driving circuits are incorporated along with other elements into the lower panel 712a. The gate PCB 719 and/or the gate FPC films 718 may be omitted in both cases.

Now, an inverter driving apparatus and an LCD including an inverter driving apparatus are described in detail with reference to FIGS. 2-6.

Figure 2:
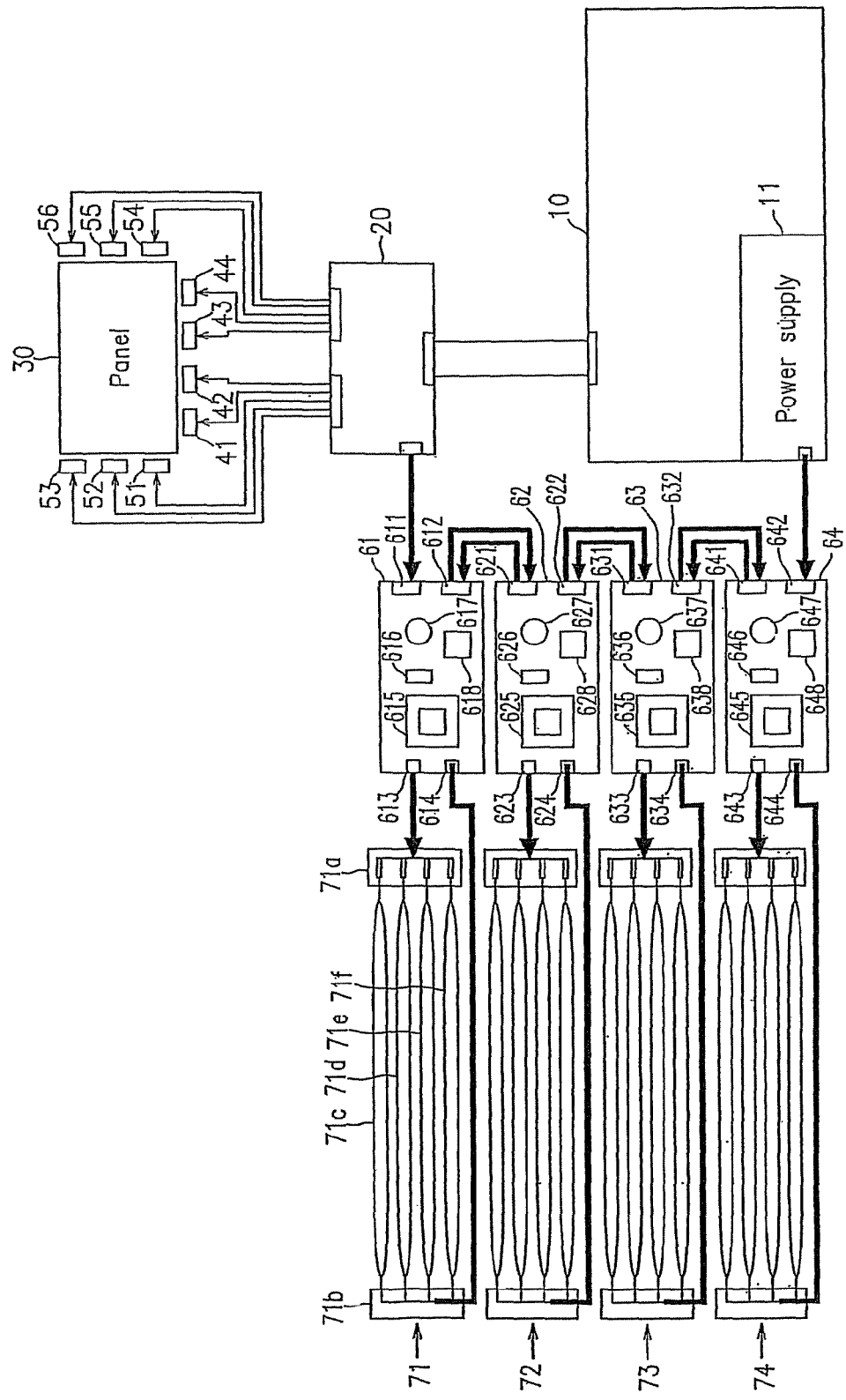
FIG. 2 is a schematic diagram of an LCD according to an embodiment of the present invention.
Figure 3:
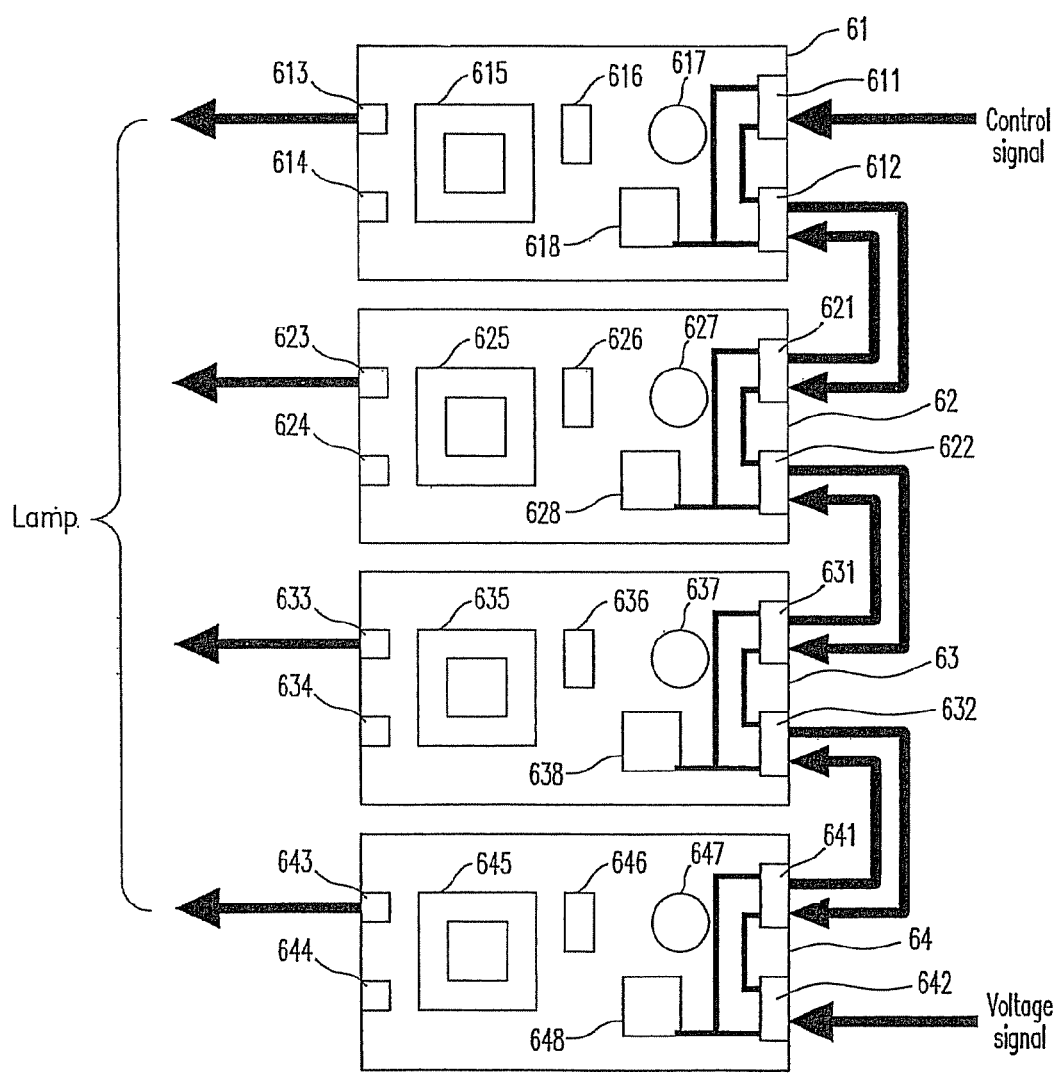
FIG. 3 is a schematic diagram of an exemplary inverter driving apparatus for the LCD shown in FIG. 2.

FIG. 2 is a schematic diagram of a system including an LCD according to an embodiment of the present invention, and FIG. 3 is a schematic diagram of an exemplary inverter driving apparatus of the LCD shown in FIG. 2.

A system shown in FIG. 2 is a television system including a system board 10 including a power supply 11, a control board 20, a LC panel assembly 30, a plurality of data driving ICs 41-44 attached to an edge of the LC panel assembly 30, a plurality of the gate driving ICs 51-56 attached to opposite edges of the LC panel assembly 30, first to fourth inverter boards 61-64, and first to fourth lamp units 71-74 connected to the first to the fourth inverter boards 61-64, respectively. The LC panel assembly 30 shown in FIG. 2 corresponds to reference numeral 712 in FIG. 1 and the control board 20 shown in FIG. 2 corresponds to reference numerals 714 and 719 (PCBs) in FIG. 1.

Since the first to the fourth lamp units 71-74 have substantially the same configuration, the first lamp unit 71 is exemplified. The first lamp unit 71 has a hot terminal 71a and a cold terminal 71b and includes four lamps 71c-71f connected in parallel between the hot terminal 71a and the cold terminal 71b. The lamps 71c-71f shown in FIG. 2 correspond to reference numerals 723 and 725 shown in FIG. 1.

The first to the fourth inverter boards 61-64 are connected in series. The first to the fourth inverter boards 61-64 are arranged parallel to the respective lamp units 71-74 and connected to each other along a direction perpendicular to the length of the lamps 71c-71f of the lamp units 71-74. As shown in FIG. 2, the first to the fourth inverter boards 61-64 are located close to the hot terminals 71a of the lamp units 71-74.

The voltages applied to the terminals 71a and 71b of the lamp units 71-74 by the inverter boards 61-64 are very high, and in particular, in a ground type shown in FIG. 2, the voltage applied to the hot terminal 71a is very high while the voltage applied to the cold terminal 71a is a ground voltage or the like. Accordingly, it is advantageous that the distance between the inverter board 61-64 and the hot terminal 71a of the lamp unit 71-74 is closer in order to reduce the voltage drop of the high voltage from the inverter board 61-64 to the hot terminal 71a of the lamp unit 71-74.

On the contrary, when the lamp unit 71-74 is a floating type, the hot terminal 71a and the cold terminal 71b are supplied with a pair of positive and negative voltages having equal magnitude and opposite polarity. The inverter board 61-64 is preferably located near the center of the lamp unit 71-74 such that the voltage drops of the voltages applied to the hot terminal 71a and the cold terminal 71b are equal. Although it seems that FIG. 1 shows the lamp units 71-74 and the inverter boards 61-64 located on a plane, they actually have three-dimensional arrangement behind the LC panel assembly 30. Therefore, the inverter boards 61-64 can be disposed near the centers of the lamp units 71-74.

Referring to FIGS. 2 and 3, each inverter board 61-64 has two connectors 611 and 612, 621 and 622, 631 and 632, or 641 and 642 (abbreviated as 611-642 hereinafter) for signal communication with external devices such as the control board 20, the system board 10, and other inverter boards 61-64, and two terminals 613 and 614, 623 and 624, 633 and 634, or 643 and 644 (abbreviated as 613-644 hereinafter) for signal communication with the lamps 71c-71f.

One outer inverter board 61 has a connector 611 for signal communication with the control board 20 and the other connector 612 for signal communication with the adjacent inverter board 62. The other outer inverter board 64 has a connector 642 for signal communication with the system board 10 and a connector 612 for signal communication with the adjacent inverter board 63. Each of the inner two inverter boards 62 and 63 has two connectors 621 and 622 or 631 and 632 for signal communication with the adjacent two inverter boards 61 and 63 or 62 and 64, respectively. The two connectors 611-642 of each inverter boards 61-64 are interconnected.

One terminal 613, 623, 633 or 643 of each inverter board 61-64 is connected to the hot terminal 71a of the corresponding lamp unit 71-74, while the other terminal 614, 624, 634 or 644 is connected to the cold terminal 71b of the corresponding lamp unit 71-74.

Each inverter board 61-64 includes a plurality of electronic circuit elements 615-618, 625-628, 635-638 or 645-648 (abbreviated as 615-648 hereinafter) for converting a DC voltage signal from the system board 10 (via other inverter boards 62-64) into an AC voltage and boosting the AC voltage to be supplied to the corresponding lamp unit 71-74 through the terminals 613-644.

Each inverter board 61-64 further includes a plurality of wires for interconnecting the two connectors 611-642, for electrically connecting the electronic circuit elements 615-648 and the connectors 611-642, for electrically connecting the electronic circuit elements 615-648 to the terminals 613-634, and for interconnecting the electronic circuit elements 615-648.

Figure 4:
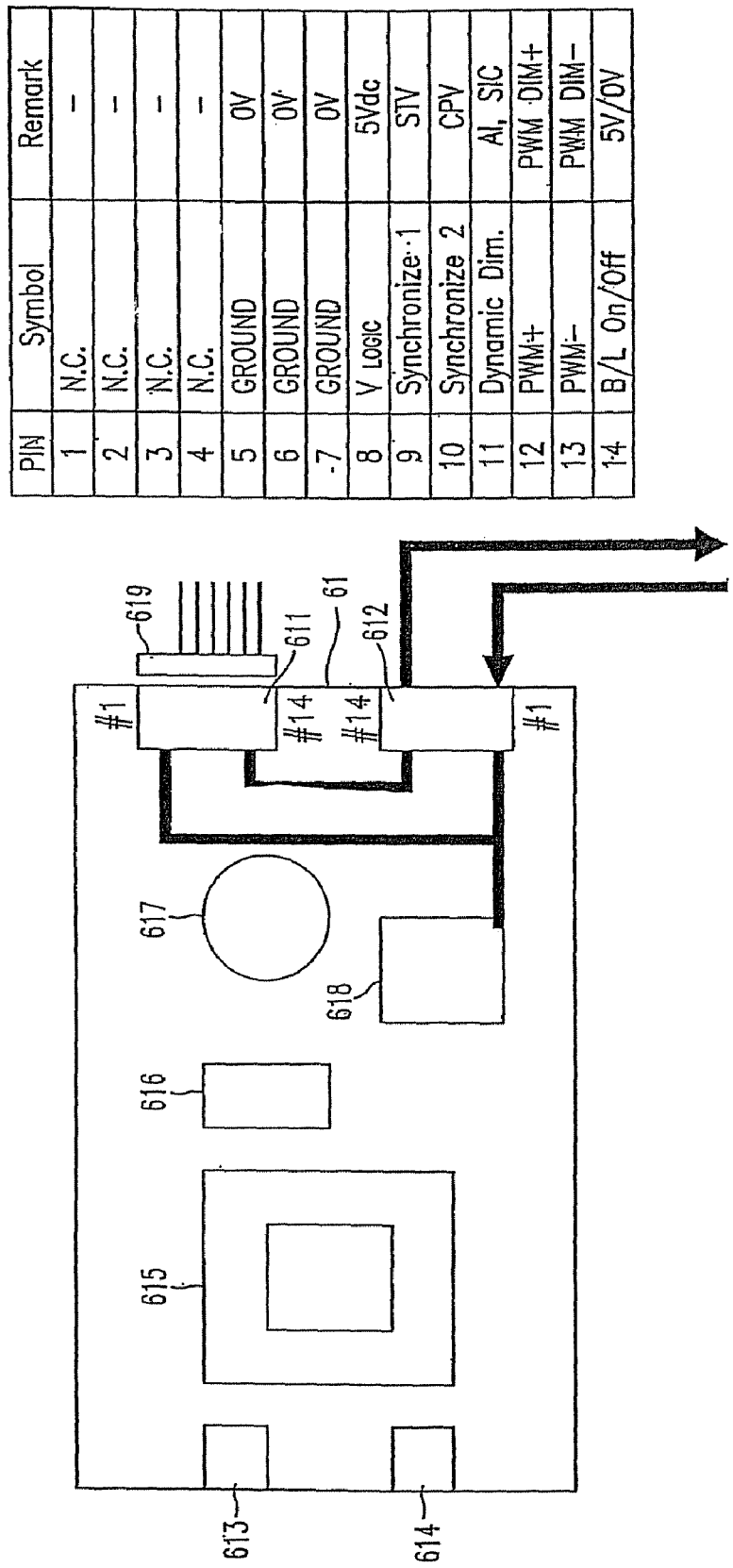
FIGS. 4-6 are exemplary schematic diagrams of an inverter board shown in FIG. 3.
Figure 5:
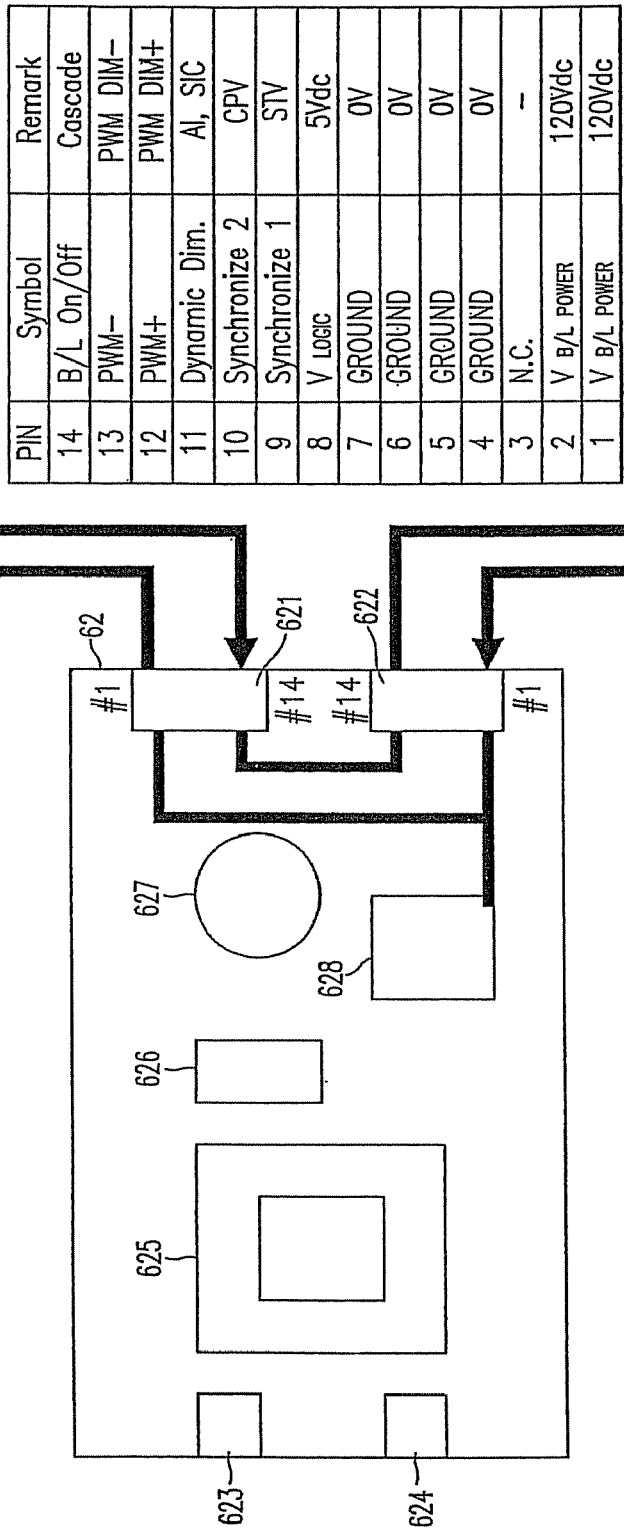
Figure 6:
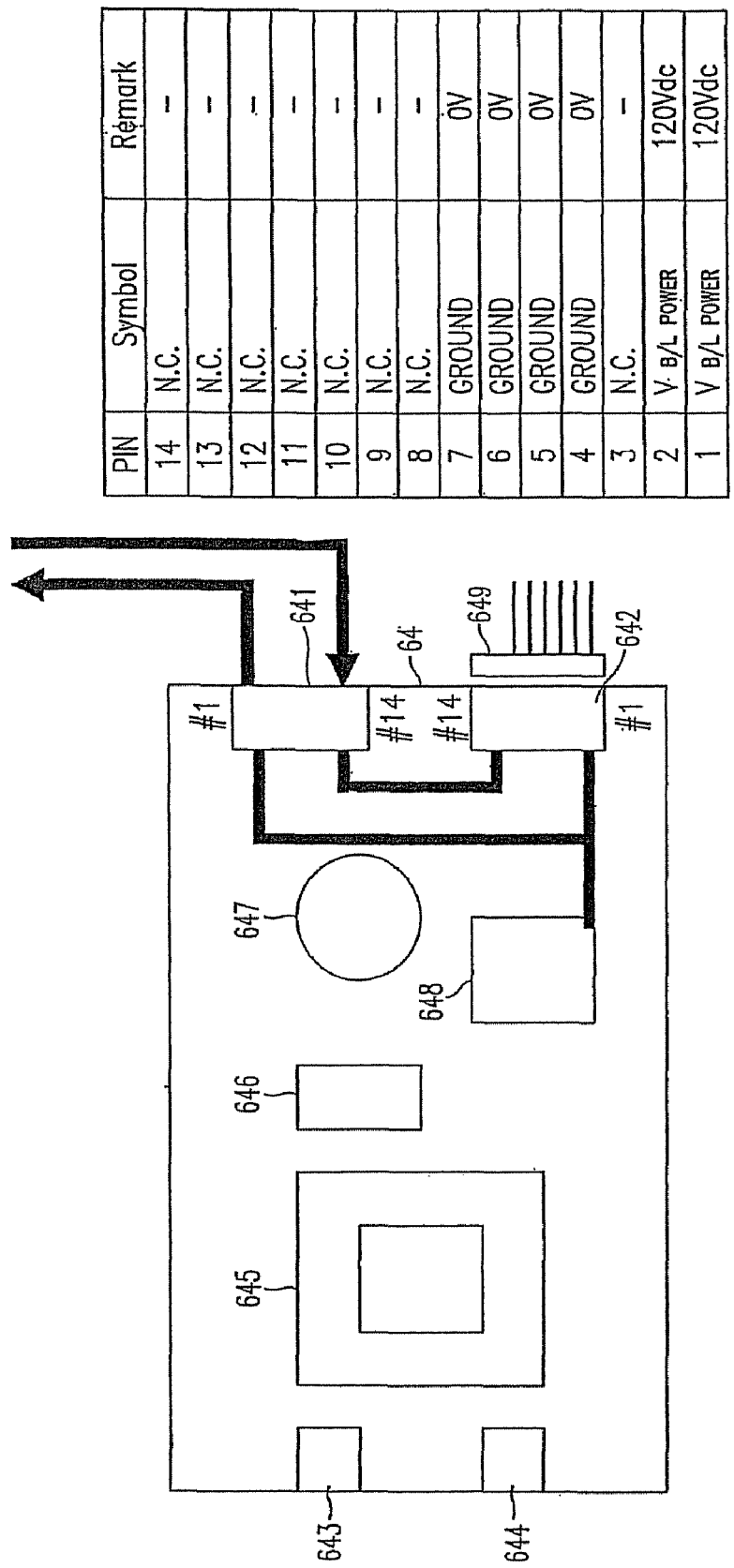

FIGS. 4-6 are schematic diagrams of an exemplary inverter board interfacing a control board, an exemplary intermediate inverter board, and an exemplary inverter board interfacing a system board, respectively, among the inverter boards of the inverter driving apparatus shown in FIG. 3.

Referring to FIGS. 4-6, each connector 611-642 has a plurality of pins including a set of pins (referred to as "power pins" hereinafter) for transmitting the voltage signals from the system board 10 and the other set of pins (referred to as "control pins" hereinafter) for transmitting the control signals from the control board 20. The pins of adjacent two connectors 612-641 are arranged in opposite order. For example, the pins of the two connectors 611-642 of each inverter board 61-64 are arranged in opposite order, that is, the corresponding pins of the two connectors 611-641 have equal ordinals from close edges of the two connectors 611-642. In addition, the arrangements of the pins of two adjacent connectors 612 and 621, 622 and 631 or 632 and 641 (abbreviated as 612-641 hereinafter) of two adjacent inverter boards 61 and 62, 62 and 63 or 63 and 64, respectively, are also symmetrical, that is, the corresponding pins of the two adjacent connectors 612-641 have equal ordinals from close edges of the two connectors 612-642.

As shown FIGS. 4-6, the corresponding pins of the connectors 611-642 are equally numbered and the corresponding pins of adjacent two connectors 612-641 are interconnected through the wires on the inverter boards 61-64 or external connectors (not shown). The pins indicated by the pin numbers (PIN) 1-7 are the power pins used for transmitting the voltage signals from the system board 10 as shown in the table of FIG. 6, while the pins indicated by the pin numbers 5-14 are the control pins used for transmitting the control signals from the control board 20 as shown in the table of FIG. 4. The pins indicated by the pin numbers 5-7 are used for transmitting signals (i.e., ground voltage signals) from both the signal board 10 and the control board 20. Otherwise, the pins indicated by the pin numbers (PIN) 1-4 are the power pins used for transmitting the voltage signals from the system board 10, while the pins indicated by the pin numbers 5-14 are the control pins used for transmitting the control signals from the control board 20.

The pins #1 and #2 are assigned to a DC voltage $V_{B/L}$ $_{POWER}$ with a magnitude of 120V for driving the lamps 71c-71f, the pins #4 to #7 are assigned to a ground voltage GROUND, and the pin #8 is assigned to a DC logic voltage $V_{LOGIC}$ with a magnitude of 5V used for digital signals. The pins #9 and #10 are assigned to synchronization signals including a vertical synchronization start signal STV and a gate clock CPV, respectively. The pin #11 is assigned to a signal AI or SIC for dynamic dimming, and the pins #12 and #13 are assigned to positive and negative pulse width modulation (PWM) dimming signals PWM DIM+ and PWM DIM−, respectively. Finally, the pin #14 is assigned to a lamp on/off signal with voltage values of 5V and 0V. In the tables shown in FIGS. 4-6, the symbol "N.C." is an abbreviation of "not connected."

The outer connector 611 of the outer inverter board 61 is electrically connected to the control board 20 through a connector 619 as shown in FIG. 4, and the outer connector 642 of the outer inverter board 64 is electrically connected to the system board 10 through a connector 649 as shown in FIG. 6. However, the electrical connection between the connector 611 and the control board 20 and between the connector 642 and the system board 10 may be obtained by other ways.

Although the above-described embodiment illustrates a television system including an LCD, the scope of the present invention is not limited thereto but also covers all types of LCDs requiring an inverter driving apparatus including a plurality of lamp units. The number of the inverter boards, the number of the lamps in each lamp unit, the connection types of the lamps, and the number of the pins in each connector, etc. are not limited to the above-described embodiment.

Now, the operation of the system will be described in detail.

When the system is powered, the system board 10 generates a plurality of display-related signals such as image signals, a vertical synchronization signal, a horizontal synchronization signal, and a clock and provides the display-related signals for the control board 20. In addition, the power supply 11 of the system board 10 generates a plurality of voltage signals for driving the lamp units 71-74 and the inverter boards 61-64 and supplies the voltage signals to the inverter boards 61-64.

The control board 20 is supplied with RGB image signals and input control signals controlling the display thereof such as a vertical synchronization signal, a horizontal synchronization signal, a main clock, and a data enable signal, from the system board 10. After generating a plurality of control signals and processing the image signals suitable for the operation of the panel assembly 30 on the basis of the input control signals and the input image signals, the control board 20 provides the control signals for the gate driving ICs 51-56, the data driving ICs 41-44, and the inverter boards 61-64, and provides the processed image signals for the data driving ICs 41-44.

The control signals include a vertical synchronization start signal for informing of start of a frame, a gate clock signal for controlling the output time of the gate-on voltage, and an output enable signal for defining the width of the gate-on voltage. The control signals further include a horizontal synchronization start signal for informing of start of a horizontal period, a load signal for instructing to apply the appropriate data voltages to the data lines, an inversion control signal for reversing the polarity of the data voltages (with respect to the common voltage) and a data clock signal.

The data driving ICs 41-44 receives a packet of the image data for a pixel row from the control board 20 and converts the image data into the analog data voltages selected from a plurality of gray voltages in response to the control signals from the control board 20.

Responsive to the control signals from the control board 20, the gate driving ICs 51-56 applies the gate-on voltage to the gate line, thereby turning on the switching elements connected thereto.

The data driving ICs 41-44 applies the data voltages to the corresponding data lines for a turn-on time of the switching elements (which is called "one horizontal period" or "1H" and equals to one periods of the horizontal synchronization signal, the data enable signal, and the gate clock signal). Then, the data voltages in turn are supplied to the corresponding pixels via the turned-on switching elements.

The difference between the data voltage and the common voltage applied to a pixel is expressed as a charged voltage of the LC capacitor, i.e., a pixel voltage. The liquid crystal molecules have orientations depending on the magnitude of the pixel voltage.

In the meantime, the inverter boards 61-64 turn on and off the lamps 71c-71f of the lamp units 71-74 based on the control signals from the control board 20 and the voltage signals from the system board 10.

The light from the lamps 71c-71f passes through the liquid crystal layer and varies its polarization according to the orientations of the liquid crystal molecules. The polarizers convert the light polarization into the light transmittance.

By repeating this procedure, all gate lines are sequentially supplied with the gate-on voltage during a frame, thereby applying the data voltages to all pixels. When the next frame starts after finishing one frame, the inversion control signal applied to the data driving ICs 41-44 is controlled such that the polarity of the data voltages is reversed (which is called "frame inversion"). The inversion control signal may be also controlled such that the polarity of the data voltages flowing in a data line in one frame are reversed (which is called "line inversion"), or the polarity of the data voltages in one packet are reversed (which is called "dot inversion").

As described above, a plurality of inverter boards connected in series for driving corresponding lamp units, each lamp unit including a plurality of lamps are provided such that a control signal and a voltage signal for driving the lamps are inter-transmitted in opposite directions. The present invention gives advantages of simple signal input, simple wire configuration, and facility of addition and deletion of inverter boards due to identical configurations of the inverter boards, etc.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An inverter driving apparatus for driving a plurality of lamp units, each lamp unit including at least one lamp, the apparatus comprising:
    a plurality of inverter boards for generating driving signals for driving respective lamp units based on a control signal and a voltage signal,
    wherein the plurality of inverter boards are connected in series and include a first outer inverter board receiving the control signal and a second outer inverter board located opposite the first outer inverter board receiving the voltage signal, and each of the plurality of inverter boards transmits the control signal or the voltage signal to at least one of the plurality of inverter boards adjacent thereto.

2. The apparatus of claim 1, wherein the at least one lamp of each lamp unit comprises a plurality of lamps connected in parallel.

3. The apparatus of claim 1, wherein the serial connection between the inverter boards is made along a direction perpendicular to a length direction of the at least one lamp.

4. The apparatus of claim 1, wherein each of the plurality of inverter boards comprises two connectors for signal transmission of the control signal and the voltage signal.

5. The apparatus of claim 4, wherein each connector has a plurality of pins, and the pins of adjacent two of the connectors are arranged in opposite order.

6. The apparatus of claim 5, wherein the two connectors of each of the plurality of inverter boards comprises a first connector for receiving the control signal and transmitting the voltage signal and a second connector for receiving the voltage signal and transmitting the control signal.

7. The apparatus of claim 5, wherein each of the plurality of inverter boards further comprises a plurality of electrical members electrically connected to the connectors for generating the driving signal.

8. The apparatus of claim 5, wherein each of the plurality of inverter boards further comprises a plurality of wires for interconnecting the two connectors included therein.

9. The apparatus of claim 4, wherein each connector has a plurality of pins, and the pins of the two connectors in each of the plurality of inverter boards are arranged in opposite order.

10. The apparatus of claim 9, wherein the pins of adjacent two connectors in adjacent two of the plurality of inverter boards are arranged in opposite order.

11. The apparatus of claim 1, wherein the first outer inverter board comprises a first connector for receiving the control signal and a second connector for receiving the voltage signal from and transmitting the control signal to another of the plurality of inverter boards.

12. The apparatus of claim 1, wherein the second outer inverter board comprises a first connector for receiving the voltage signal and a second connector for receiving the control signal from and transmitting the voltage signal to another of the plurality of inverter boards.

13. The apparatus of claim 1, wherein the plurality of inverter boards further comprises an intermediate inverter board connected to the first outer inverter board, the intermediate inverter board comprising a first connector for receiving the control signal from and transmitting the voltage signal to the first outer inverter board and a second connector for receiving the voltage signal from and transmitting the control signal to another of the plurality of inverter boards.

14. The apparatus of claim 1, wherein the plurality of inverter boards further comprises an intermediate inverter board connected to the second outer inverter board, the intermediate inverter board comprising a first connector for receiving the control signal from and transmitting the voltage signal to another of the plurality of inverter boards and a second connector for receiving the voltage signal from and transmitting the control signal to the second outer inverter board.

* * * * *